J. PATE.
HAY STACKING APPARATUS.
APPLICATION FILED MAR. 17, 1908.
914,178.
Patented Mar. 2, 1909.
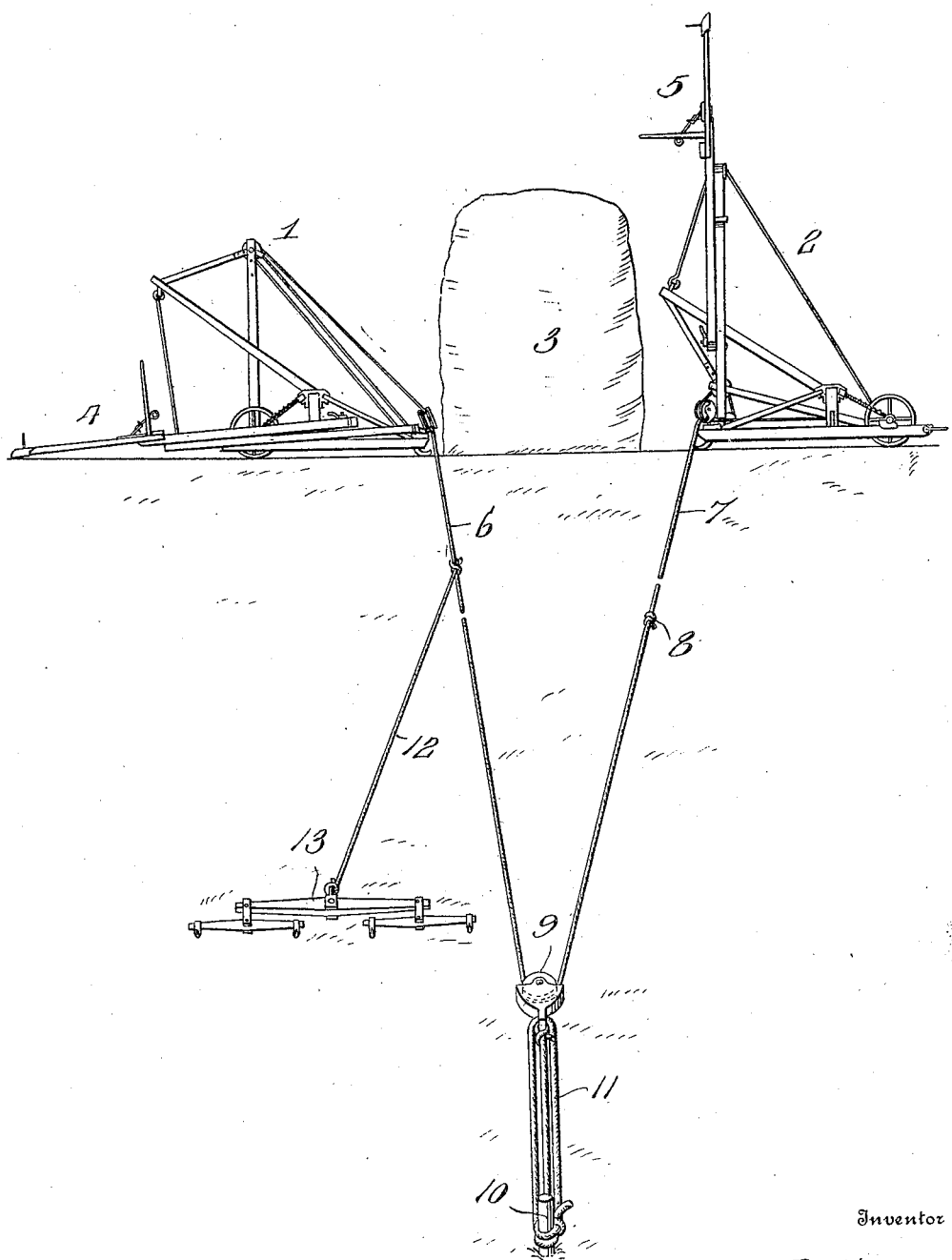
Witnesses
Frank Hough
K. Allen.
Inventor
John Pate,
By Victor J. Evans
Attorney

UNITED STATES PATENT OFFICE.

JOHN PATE, OF ELWOOD, KANSAS.

HAY-STACKING APPARATUS.

No. 914,178.  Specification of Letters Patent.  Patented March 2, 1909.

Application filed March 17, 1908. Serial No. 421,733.

*To all whom it may concern:*

Be it known that I, JOHN PATE, a citizen of the United States, residing at Elwood, in the county of Doniphan and State of Kansas, have invented new and useful Improvements in Hay-Stacking Apparatus, of which the following is a specification.

The invention relates to an improvement in hay stacking apparatus, being particularly directed to a construction in the use of which two hay stackers may be conveniently operated for the upbuilding of a single stack.

The main object of the present invention is the production of means by which hay stackers located on the opposite sides of a stack may be simultaneously and reversely operated in the upbuilding of a stack.

The invention will be described in the following specification, reference being had particularly to the accompanying drawing, in which:—the figure is a perspective view illustrating the application of my improvement.

Referring particularly to the accompanying drawings, it will be understood that the invention is directed to a means whereby two independent hay stackers may be simultaneously used for the upbuilding of a stack, the particular means, which forms the subject matter of the present invention, being so arranged and operated as to simultaneously but reversely actuate the stackers.

In connection with the present invention it is to be understood that the form of stacker used is not material, as I contemplate any desired form of stacker which is adapted to receive the hay from the rakes and elevate the same onto the stack.

For the purposes of the present invention the stackers 1 and 2, preferably of duplicate construction, are disposed on opposite sides of the stack 3, the hay receiving platforms 4 and 5 of the stackers being adapted to be elevated through the medium of cables 6 and 7 respectively, all of which parts are of usual construction and operation. It is with the operating cables 6 and 7 that the present invention is more intimately concerned, and these cables, in carrying out the present invention are formed into a single cable by suitably connecting them, as at 8. This cable passes around a sheave 9 which is secured to a post or other upright 10 through the medium of a flexible connection 11, whereby the position of the sheave relative to the post may be adjusted as desired. The single cable is thus operatively connected to both stackers 1 and 2 and is passed centrally about a sleeve arranged in effect between the stackers, so that elevation of one of the hay platforms will permit a lowering of the other. A draft cable 12 is secured to the endless cable connected with both stackers at a point a sufficient distance from the sheave to permit the necessary movement of the cable to be described. The end of the draft cable is designed to be adapted for operation in any suitable manner, being connected to an engine or to a doubletree 13 for the usual draft animals.

With the parts arranged as described and the stackers disposed upon opposite sides of the position which the stack to be built is to occupy, the respective hay platforms will of necessity occupy opposite positions, that is one of the platforms will be elevated and the other lowered, as shown in the drawing. The lowered stacker is supplied with the desired quantity of hay, and the draft cable operated with the effect to elevate the loaded platform into a position to discharge its load onto the stack and at the same time lower the platform of the other stacker, which is then loaded. The draft animals are then driven in the opposite direction with the effect to elevate the platform of the second stacker and permit a lowering movement of the platform of the first stacker. By this operation the respective stackers are reversely actuated, one being at all times in position to be loaded from the rakes and the other in position to discharge the load onto the stack. Furthermore, both stackers are operated through the continuous pull of a single team, thereby dispensing entirely with the second team heretofore necessary in the operation of the second stacker.

Having thus described the invention what is claimed as new, is:—

The combination with two hay stackers, of a single operating cable terminally connected to the respective stackers, a cable engaging means arranged between the stackers, a fixture, and an adjustable connection between said fixture and cable engaging means whereby the operating cable may be maintained at proper tension at all times, said engaging means being arranged so that operation of said cable in either direction will positively operate one of the stackers, and a draft cable connected to the operating cable between one of the stackers and the cable engaging means, whereby said operating cable may be successively operated in opposite directions and the particular stacker positively actuated in each movement of the cable.

In testimony whereof I affix my signature in presence of two witnesses.

JOHN PATE.

Witnesses:
J. P. DUNN,
O. KLEIN BEVETT.